Dec. 21, 1965 P. DE PUE 3,224,116
MULTIPLE ANSWER EXAMINATION GRADING DEVICE
Filed Nov. 13, 1962

INVENTOR.
PALMER DePUE
BY
Raymond W. Wootten
ATTORNEY

United States Patent Office 3,224,116
Patented Dec. 21, 1965

3,224,116
MULTIPLE ANSWER EXAMINATION
GRADING DEVICE
Palmer De Pue, 2027 Devereaux Ave., Philadelphia, Pa.
Filed Nov. 13, 1962, Ser. No. 236,831
10 Claims. (Cl. 35—48)

This invention relates to a grading device for use in arriving at the grades achieved by students in connection with multiple choice or multiple answer examinations.

As is well known to those conversant with examinations of these types, where the examination is of the true or false variety involving only two possible answers, the probability of a student arriving at the correct answer by chance is far greater than where there are more than two possible choices. Accordingly, where there are three possible choices, rather than two, the value of a correct answer should be somewhat higher. Similarly, where there are four possible choices instead of three, the value of each correct answer should be even higher. And where the multiple choices are five in number, the value of each question should be greater than where there were only four possible choices. This relationship has been taken into account, in accordance with the present invention and at the same time, a single tabulation has been provided whereby the percentage mark to be credited to an examination is solely dependent upon the number of correct answers, or alternatively, the number of incorrect answers, where the number of multiple choices is two, three, four or five, by providing progressively smaller numbers of questions in an examination as the number of multiple choices increases.

By virtue of the present invention, the clerical work on the part of both student and instructor is appreciably reduced and the grading of papers is rendered almost automatic in connection with the types of examinations under consideration.

It is among the objects of the present invention to provide a multiple answer examination grading device comprising a printed sheet bearing first sequential indicia arranged in a first reference column and corresponding respectively to questions to be answered, second and third indicia of similar configuration arranged in second and third grading columns respectively parallel to the first column and arranged in rows aligned with the first indicia respectively, and fourth indicia similar in configuration and spacing to the second and third indicia arranged in a fourth grading column parallel to and shorter than the first column and arranged in rows aligned with a portion only of the first indicia, the product of three times the number of indicia in the fourth column exceeding the product of two times the number of indicia in the third column. The device may include fifth indicia similar in configuration and spacing to the fourth indicia arranged in a fifth grading column parallel to and shorter than the fourth column and arranged in rows aligned with a portion only of the fourth indicia, the product of four times the number of indicia in the fifth column exceeding the product of three times the number of indicia in the fourth column by an amount greater than the product of three times the number of indicia in the fourth column exceeds the product of two times the number of indicia in the third column.

The device may further include sixth indicia similar in configuration and spacing to the fifth indicia arranged in a sixth grading column parallel to and shorter than the fifth column and arranged in rows aligned with a portion only of the fifth indicia, the product of five times the number of indicia in the sixth column exceeding the product of four times the number of indicia in the fifth column by an amount greater than the product of four times the number of indicia in the fifth column exceeds the product of three times the number of indicia in the fourth column.

The device preferably includes a verifying sheet containing a number of openings corresponding to the number of indicia in the third column and arranged in rows aligned with the indicia in the second and third column and registering with indicia in at least one of the second and third columns.

The verifying sheet preferably contains a number of openings corresponding to the number of indicia in the fourth column arranged in rows aligned with the indicia in the fourth column and registering with indicia in at least one of the second, third and fourth columns.

The vertifying sheet may contain a number of openings corresponding to the number of indicia in the fifth column arranged in rows aligned with the indicia in the fifth column and registering with indicia in at least one of the second, third, fourth and fifth columns.

The vertifying sheet may contain a number of openings corresponding to the number of indicia in the sixth column arranged in rows aligned with the indicia in the sixth column and registering with indicia in at least one of the second, third, fourth, fifth and sixth columns.

One of the sheets preferably bears a table including grade indicia corresponding to each of a number of incorrect answers.

The device contemplated by the present invention may contain twenty indicia in each of the second and third columns, fifteen indicia in the fourth column, thirteen indicia in the fifth column and twelve indicia in the sixth column.

A more complete understanding of the invention will follow from a description of the accompanying drawings wherein.

Figure 1:
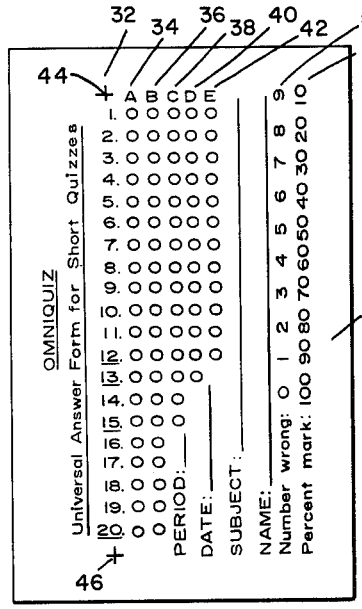
FIG. 1 is a plan view of the printed sheet.

The printed strip 30 shown in FIG. 1 is imprinted with six columns 32, 34, 36, 38, 40 and 42. The first column is a reference column and contains sequential indicia made up of the numerals one through twenty defining horizontal rows which may be identified by these same numbers which correspond respectively to the number of questions to be answered in connection with a two-choice examination. The second column 34 and the third column 36, headed by the letters A and B respectively, are grading columns and contain indicia of similar configuration parallel to the first column and arranged in rows aligned with the indicia of the first column respectively.

The fourth column also a grading column, is headed by the later C and contains fifteen indicia similar to those in the second and third columns and arranged in rows aligned with the numerals one through fifteen. The fifth column 40 is likewise a grading column and is headed by the letter D and contains thirteen indicia in a column parallel to the preceding columns and in rows aligned with the numerals one through thirteen of the first column. The sixth column 42 is another grading column and is headed by the letter E and contains twelve indicia similar to those of the preceding columns 34, 36, 38 and 40, arranged in a column parallel to the preceding columns and in rows aligned with the numerals one through twelve of column 32. At the head of column 32 a registration marking 44 is provided and aligned therewith below the column 32 is a similar registration marking 46.

It will be noted that the printed sheet 30 is provided with blanks to receive identification of the period involved, the date of the examination, the subject and the name of the student. The sheet also bears indicia from zero through nine indicating the number of wrong answers, and corresponding with each of these indicia, percent marks diminishing from one hundred to ten in equal increments corresponding respectively to the adjacent numbers which indicate the wrong answers.

Figures 2, 3:
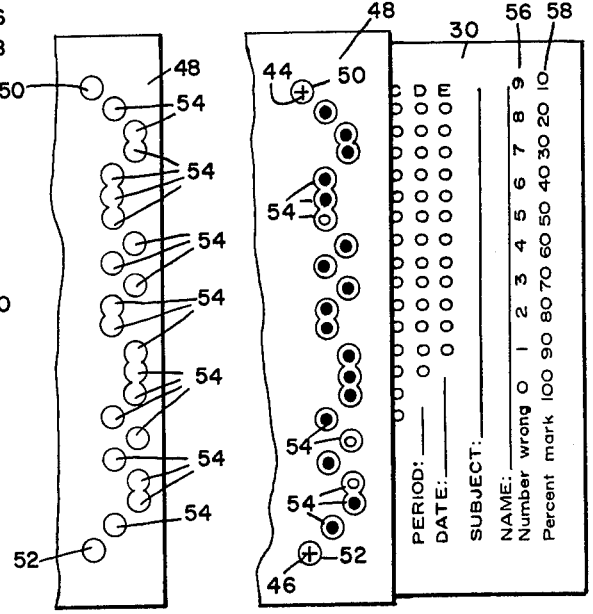
FIG. 2 is a fragmentary plan view of a verifying sheet.
FIG. 3 is a plan view showing the fragmentary vertifying sheet of FIG. 2 superimposed in registering relationship over a portion of a printed sheet such as that shown in FIG. 1 which has been marked by a student in connection with an examination involving two choices.

After an instructor has prepared the examination questions, he will produce a stencil or verifying sheet such as that dispicted in FIG. 2 for superimposition over the answer sheets 30. As shown in FIG. 2, there is a verifying sheet 48 containing punched openings 50 and 52 corresponding with the registration markings 44 and 46 respectively, and openings 54 corresponding with the correct answers in an examination involving two multiple choices, the columns of openings corresponding with the indicia of only the two columns 34 and 36 of the printed sheet. A stencil of this type can be prepared rather quickly by the instructor who will first complete a printed sheet 30 by suitably marking the indicia in columns 34 and 36 in accordance with the correct choice, superimposing such a marked printed sheet on a stencil blank and then punching the registration openings 50 and 52 in registry with the markings 44 and 46 respectively, and then proceeding to punch a hole corresponding to each marked indicia in columns 34 and 36.

Then, after the examination and one of the printed forms 30 has been furnished to the student, the student will proceed to mark the indicia in accordance with his concept of the correct answers. In the event that all of the answers selected by the student are correct, when the stencil or verifying sheet 48 is superimposed in proper registry with his marked printed sheet, only marked indicia will appear through the stencil openings. In the case of the example depicted in FIG. 3, since three indicia from the printed sheet appear through openings 54 in the stencil 48, the instructor recognizes immediately that three questions have been answered incorrectly and by referring to the "number wrong" numerals arranged in a column 56, he need only glance to the corresponding "percent mark" in the adjacent column 58 to determine that the correct grade is "seventy."

Figure 4:
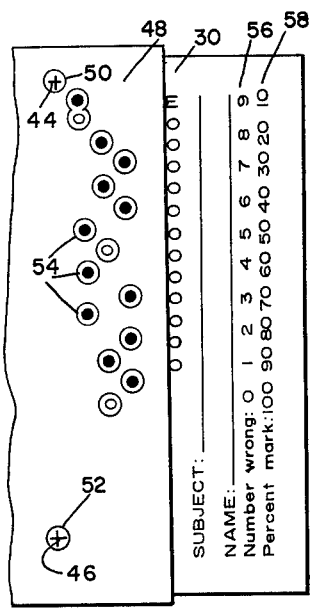
FIG. 4 is a plan view similar to FIG. 3 depicting the relationship where the examination has involved three choices.

FIG. 4 illustrates a verifying sheet 48 punched with openings corresponding to the correct answers in connection with a three-choice examination superimposed on a printed sheet 30 which a student has marked with what purport to be correct answers. Here again, three unmarked indicia appear through the openings 54 in the verifying sheet, and again referring to columns 56 and 58 it will be found that the correct grade is "seventy." Thus it will appear that where there are only two choices, the value of a correct answer is slightly less than where there are three choices, since the probability of a correct guess is smaller in the case of the greater number of choices. Similarly, as will be observed in conjunction with FIGS. 5 and 6, as the number of choices increases the value of each correct answer increases.

Figure 5:
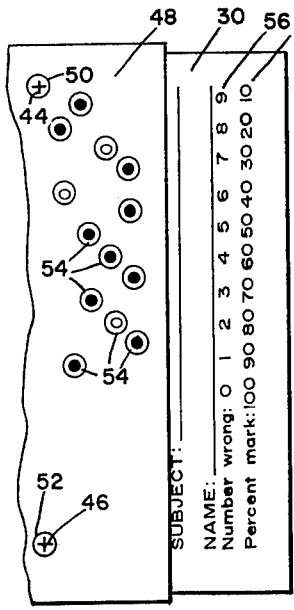
FIG. 5 is a view similar to that of FIGS. 3 and 4 where the number of multiple choices is four.
Figure 6:
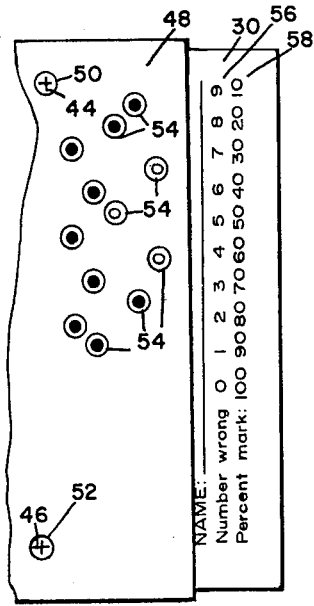
FIG. 6 is a view similar to that of FIGS. 3, 4 and 5 wherein the examination has involved five multiple choice answers.

FIG. 5 depicts a verifying sheet 48 punched for registration with a marked printed sheet relating to a four-choice examination. And in a similar fashion, FIG. 6 depicts a verifying sheet 48 punched for registration with a printed sheet 30 marked in connection with a five-choice examination. In the case of each of FIGS. 5 and 6, it will be noted that there are three incorrect answers and by referring to the columns 56 and 58 in each case, the grade will be found to be "seventy." Thus, by utilizing a fewer number of questions as the number of choices increases, automatic compensation can be made for the chance factor and at the same time the grade computation is rendered almost automatic.

It will be evident that in connection with each of the examinations depicted in the drawings, the grade will be directly dependent on the number of incorrect answers indicated by unmarked indicia appearing through the openings 54 of the verifying sheet 48.

From the foregoing it is evident that the number of indicia in the highest specified number $n$ of grading columns for a given examination is an integer approximating the value expressed by $$\frac{10}{1-\frac{1}{n}}$$

Hence where there are two choices, two grading columns will be used and the number of questions employed to achieve substantially automatic scoring will be:

$$\frac{10}{1-\frac{1}{2}}=20$$

Where there are three choices, the number of questions employed will be:

$$\frac{10}{1-\frac{1}{3}}=15$$

Where there are four choices, the number of questions employed will be:

$$\frac{10}{1-\frac{1}{4}}=13\frac{1}{4} \text{ or } 13$$

Where there are five choices, the number of questions employed will be:

$$\frac{10}{1-\frac{1}{5}}=12\frac{1}{2} \text{ or } 12$$

It will be understood that the principles illustrated by the foregoing description and accompanying drawings can be extended to include various numbers of questions and various numbers of choices, all within the scope of the invention contemplated by the appended claims.

I claim:

1. A multiple answer examination grading device comprising a printed sheet bearing first sequential indicia arranged in a first reference column and corresponding respectively to questions to be answered, second and third indicia of mutually similar configuration arranged in second and third grading columns respectively parallel to said first column and arranged in rows aligned with said first indicia respectively, and fourth indicia similar in configuration and spacing to said second and third indicia arranged in a fourth grading column parallel to and shorter than said first column and arranged in at least twelve rows aligned with a portion only of said first indicia, said sheet bearing a single scoring table indicating correct grades for examinations having two choices and a number of questions corresponding to the number of indicia in said third column, and for examinations having three choices and a number of questions corresponding to the number of indicia in said fourth column, the number of indicia in the highest specified number of grading columns being an integer approximating the value expressed by $$\frac{10}{1-\frac{1}{n}}$$

where $n$ is said highest number.

2. A multiple answer examination grading device according to claim 1 including fifth indicia similar in configuration and spacing to said fourth indicia arranged in a fifth grading column parallel to and shorter than said fourth grading column and arranged in rows aligned with a portion only of said fourth indicia, said scoring table indicating correct grades for examinations having four choices and a number of questions corresponding to the number of indicia in said fifth column.

3. A multiple answer examination grading device according to claim 2 including sixth indicia similiar in configuration and spacing to said fifth indicia arranged in a sixth grading column parallel to and shorter than said fifth grading column and arranged in rows aligned with a portion only of said fifth indicia, said scoring table indicating correct grades for examinations having five choices and a number of questions corresponding to the number of indicia in said sixth column.

4. A multiple answer examination grading device according to claim 1 including a verifying sheet containing a number of openings corresponding to the number of indicia in said third grading column and arranged in rows aligned with the indicia in said second and third grading columns and registering with indicia in at least one of said second and third grading columns.

5. A multiple answer examination grading device according to claim 1 including a verifying sheet containing a number of openings corresponding to the number of indicia in said fourth grading column arranged in rows aligned with the indicia in said fourth grading column and registering with indicia in at least one of said second, third and fourth grading columns.

6. A multiple answer examination grading device according to claim 2 including a verifying sheet containing a number of openings corresponding to the number of indicia in said fifth grading column arranged in rows aligned with the indicia in said fifth grading column and registering with indicia in at least one of said second, third, fourth and fifth grading columns.

7. A multiple answer examination grading device according to claim 3 including a verifying sheet containing a number of openings corresponding to the number of indicia in said sixth grading column arranged in rows aligned with the indicia in said sixth grading column and registering with indicia in at least one of said second, third, fourth, fifth and sixth grading columns.

8. A multiple answer examination grading device according to claim 1 wherein there are twenty indicia in each of said second and third grading columns and fifteen indicia in said fourth grading column.

9. A multiple answer examination grading device according to claim 2 wherein the number of indicia in said third, fourth and fifth grading columns are respectively twenty, fifteen and thirteen.

10. A multiple answer examination grading device according to claim 3 wherein the number of indicia in said third, fourth, fifth and sixth grading columns are respectively twenty, fifteen, thirteen and twelve.

References Cited by the Examiner
UNITED STATES PATENTS

| | | | |
|---|---|---|---|
| 1,586,628 | 6/1926 | Lauterbach | 35—48.1 |
| 1,915,653 | 6/1933 | Dutton | 35—48.1 |
| 2,052,369 | 8/1936 | Toops | 35—48.1 |
| 2,060,308 | 11/1936 | Harding | 35—48.1 |
| 2,228,331 | 1/1941 | Warner | 35—48.1 |
| 2,614,338 | 10/1952 | Clark | 35—48.1 |

EUGENE R. CAPOZIO, *Primary Examiner.*

GEORGE A. HINES, JR., *Examiner.*